US008798467B2

(12) United States Patent
Chan et al.

(10) Patent No.: US 8,798,467 B2
(45) Date of Patent: Aug. 5, 2014

(54) OPTICAL COUPLER TESTING SYSTEM

(75) Inventors: Eric Chan, Mercer Island, WA (US); Dennis Gary Koshinz, Bellevue, WA (US); Tuong K. Truong, Bellevue, WA (US); Bark-Hung Henry Pang, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 13/533,608

(22) Filed: Jun. 26, 2012

(65) Prior Publication Data

US 2013/0343745 A1 Dec. 26, 2013

(51) Int. Cl.
*H04B 17/00* (2006.01)
*H04J 14/00* (2006.01)

(52) U.S. Cl.
USPC .................................. 398/45; 398/25; 398/38

(58) Field of Classification Search
USPC ................. 398/25, 45, 48, 50, 38, 15, 16, 82; 356/73.1
See application file for complete search history.

(56) References Cited

U.S. PATENT DOCUMENTS

| | | | |
|---|---|---|---|
| 4,200,356 A | 4/1980 | Hawkes et al. | |
| 4,265,514 A | 5/1981 | Wellington et al. | |
| 4,598,975 A | 7/1986 | Bussard et al. | |
| 4,707,069 A | 11/1987 | Hoffman, III | |
| 4,822,128 A | 4/1989 | Imoto et al. | |
| 4,995,692 A | 2/1991 | Diliello et al. | |
| 5,195,162 A | 3/1993 | Sultan et al. | |
| 5,642,447 A | 6/1997 | Pan et al. | |
| 5,642,448 A | 6/1997 | Pan et al. | |
| 5,652,814 A | 7/1997 | Pan et al. | |
| 5,675,679 A | 10/1997 | Yuuki | |
| 5,812,572 A * | 9/1998 | King et al. | 372/38.04 |
| 5,889,904 A | 3/1999 | Pan et al. | |
| 5,966,484 A | 10/1999 | Yuuki | |
| 6,108,074 A * | 8/2000 | Bloom | 356/73.1 |
| 6,125,228 A | 9/2000 | Gong | |
| 6,636,664 B2 * | 10/2003 | Snyder et al. | 385/36 |
| 6,930,767 B2 * | 8/2005 | Su | 356/73.1 |
| 7,965,913 B2 | 6/2011 | Chan et al. | |
| 2008/0219623 A1 | 9/2008 | Sklarek et al. | |
| 2013/0148926 A1 | 6/2013 | Koshinz et al. | |

FOREIGN PATENT DOCUMENTS

| | | |
|---|---|---|
| EP | 0568190 A1 | 11/1993 |
| EP | 0585114 A1 | 3/1994 |
| EP | 0646814 A1 | 4/1995 |
| GB | 2058396 A | 4/1981 |
| WO | WO9814766 A1 | 4/1998 |

OTHER PUBLICATIONS

"Plastic Fiber Couplers/Splitters/Reflectors," Comcore Technologies, Inc., 1 page, accessed Oct. 12, 2011, http://www.comcore.com/products/category.asp?cid=10.

(Continued)

*Primary Examiner* — Dalzid Singh
(74) *Attorney, Agent, or Firm* — Yee & Associates, P.C.

(57) ABSTRACT

A method and apparatus for testing an optical coupler. Inputs of the optical coupler are connected to output ports of an optical signal source. Outputs of the optical coupler are connected to input ports of an optical signal detector system. Optical signals sent through combinations of the inputs and the outputs of the optical coupler are measured using a switching system controlled by a controller to form measurements of the optical signals.

17 Claims, 9 Drawing Sheets

(56) References Cited

OTHER PUBLICATIONS

"OP850, Insertion Loss Measurement," OptoTest Corp., 1 page, accessed Jun. 22, 2012, http://www.optotest.com/DataSheets/OP850.pdf.
Koshinz et al., "Optical Star Coupler for Plastic Optical Fibers," U.S. Appl. No. 13/316,682, filed Dec. 12, 2011, 53 pages.
EP search report, dated Oct. 7, 2013 regarding application No. EP13171741.5, reference NAM/P127027EP00, applicant The Boeing Company, 7 pages.
EP search report dated Mar. 18, 2013 regarding application 12195484.6-1504, reference NAM/P124968EP00, applicant The Boeing Company, 10 pages.

* cited by examiner

FIG. 6
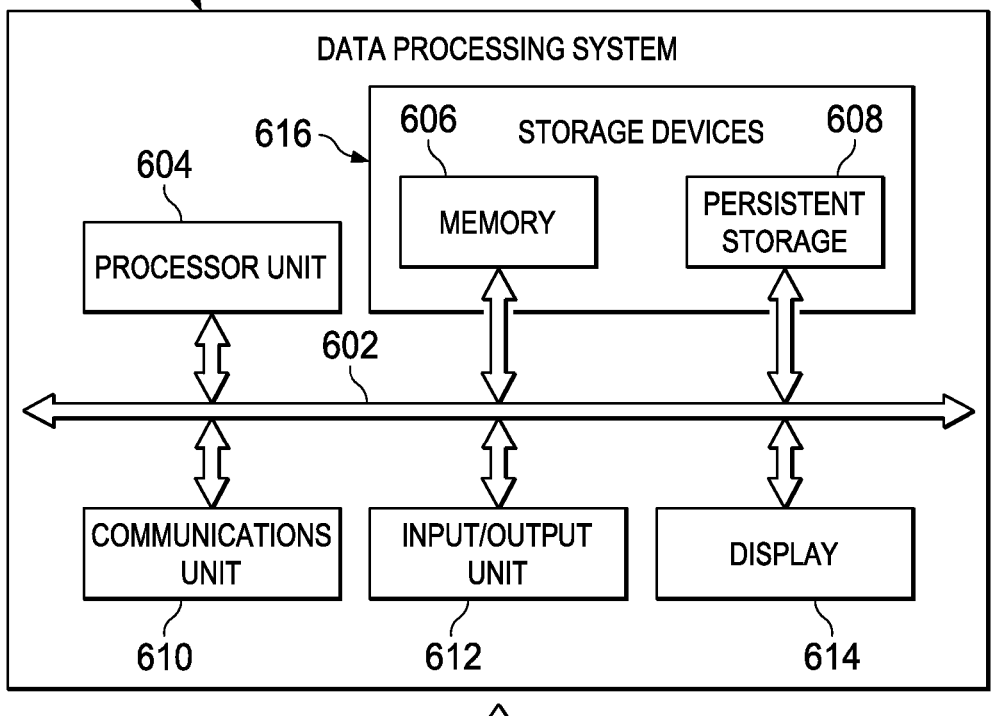
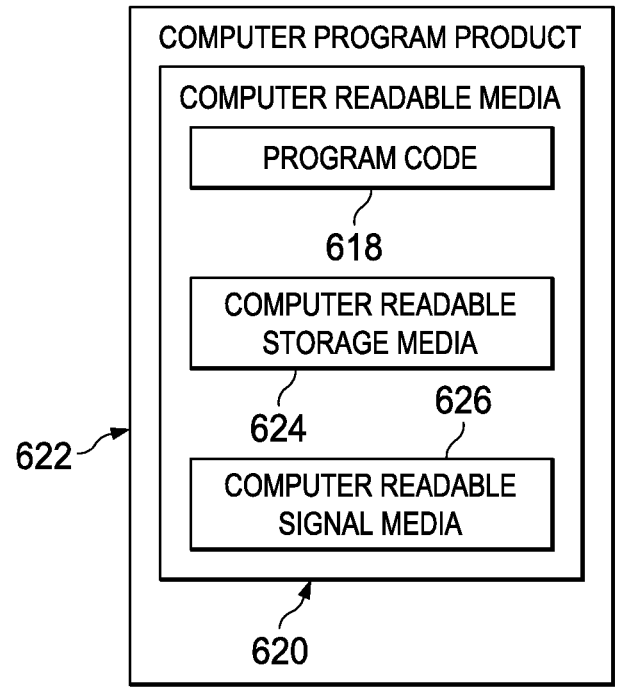

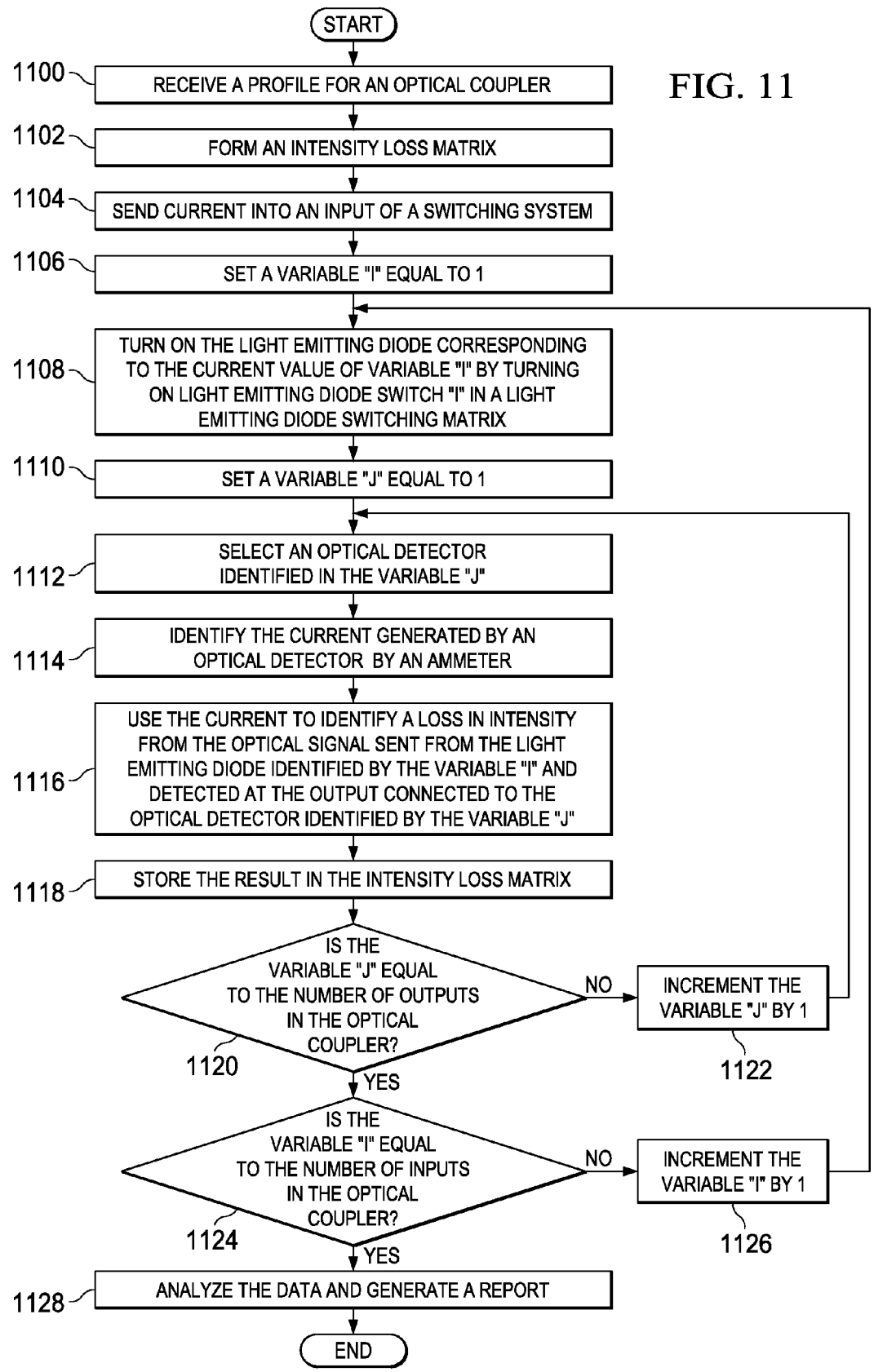

OPTICAL COUPLER TESTING SYSTEM

CROSS-REFERENCE TO RELATED APPLICATION

This application is related to the following patent application: entitled "Optical Star Coupler for Plastic Optical Fibers," Ser. No. 13/316,682, filed Dec. 12, 2011, assigned to the same assignee, and incorporated herein by reference.

BACKGROUND INFORMATION

1. Field

The present disclosure relates generally to optical networks and, in particular, to optical couplers in optical networks. Still more particularly, the present disclosure relates to a method and apparatus for testing an optical coupler used in an optical network.

2. Background

Aircraft network data processing systems currently use communications links formed using metal wires. These metal wires provide connections to exchange information between different data processing systems within the aircraft. These data processing systems may include, for example, a flight management system, an environmental system, a sensor system, an in-flight entertainment system, an electronic flight bag, and other components that may be used within an aircraft.

The use of metal wires may result in more space being used and more weight being present in the aircraft than desired. For example, the different metal wires may be placed into wiring bundles. The diameter of the metal wires may make these wiring bundles larger than desired. Further, as the number of metal wires needed increases, the weight of these wire bundles may be greater than desired.

In addition to the size and weight of the metal wires, other components used to connect these metal wires to form a network also may be heavier and larger than desired. For example, couplers, terminators, mounting panels, and other components that are used to form the network data processing system also may add more weight and size than desired within the aircraft.

One manner in which weight and size may be reduced is through the use of optical fibers in place of metal wires. An optical fiber is a flexible and transmissive optical waveguide that may be made of silica, plastic, or other materials having desirable capabilities to carry optical signals. Optical fibers may take various forms. For example, optical fibers may take the form of glass optical fibers or plastic optical fibers.

Optical fibers may be used to make wear-resistant, or ruggedized, cables to implement networks for the aircraft network data processing systems. Optical fibers are thinner and lighter than a metal wire or a wire bundle and optical fiber has much higher bandwidth than metal wire.

The use of optical fibers may be more desirable than the use of metal wires. For example, optical fibers may permit transmission of optical signals over longer distances and at higher data rates than the use of metal wires. Optical signals sent over optical fibers may have a lower loss as compared to electrical signals sent over metal wires for the same distance.

Further, the use of optical fibers is also desirable because these types of fibers are immune to electromagnetic interference. These and other characteristics make the use of optical fibers for transmitting information between devices in a network data processing system desirable for vehicles such as aircraft and spacecraft. Further, it is desirable for the optical fibers to meet the same requirements as the metal wires that they replace in an aircraft.

With optical networks used to implement an aircraft network data processing system, desired operation of the aircraft network data processing system requires the different components to be able to exchange information as quickly as needed for the desired level of performance. For example, providing sufficient bandwidth for exchanging information between data processing systems in the optical network is desirable to provide desired operation of the aircraft network data processing system.

Testing is performed for various components in the optical network such as optical fibers, transmitters, receivers, switches, couplers, and other components. This testing may be performed at various temperatures. These temperatures are typically selected as operating temperatures expected for the aircraft network data processing system as well as temperatures that may be beyond what is normally expected. Testing at extended operating temperatures may result in increased reliability of the aircraft network data processing system.

This testing of the different components in an optical network, however, may require more time and effort than desired. The testing of the different components may increase the expense for an aircraft. Additionally, the testing also may result in delivery times that may be longer than desired for the aircraft.

Therefore, it would be desirable to have a method and apparatus that takes into account at least some of the issues discussed above, as well as possibly other issues.

SUMMARY

In one illustrative embodiment, an apparatus comprises an optical signal source, an optical signal detector system, a switching system, and a controller. The optical signal source is configured to generate an optical signal. The optical signal detector system is configured to detect the optical signal. The switching system is configured to direct the optical signal from the optical signal source to inputs in an optical coupler. The switching system is further configured to direct the optical signal from outputs in the optical coupler to the optical signal detector system. The controller is configured to automatically control the switching system to select the inputs in the optical coupler for transmission of the optical signal into the optical coupler. The controller is further configured to select the outputs in the optical coupler for measuring the optical signal output from the optical coupler. The controller is further configured to measure the optical signal from the outputs selected to form measurements.

In another illustrative embodiment, a method for testing an optical coupler is present. Inputs of the optical coupler are connected to output ports of an optical signal source. Outputs of the optical coupler are connected to input ports of an optical signal detector system. Optical signals sent through combinations of the inputs and the outputs of the optical coupler are measured using a switching system controlled by a controller to form measurements of the optical signals.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a block diagram of a data processing system in accordance with an illustrative embodiment;

FIG. 11 is an illustration of a flowchart of a process for testing an optical coupler in accordance with an illustrative embodiment.

DETAILED DESCRIPTION

Figure 1:
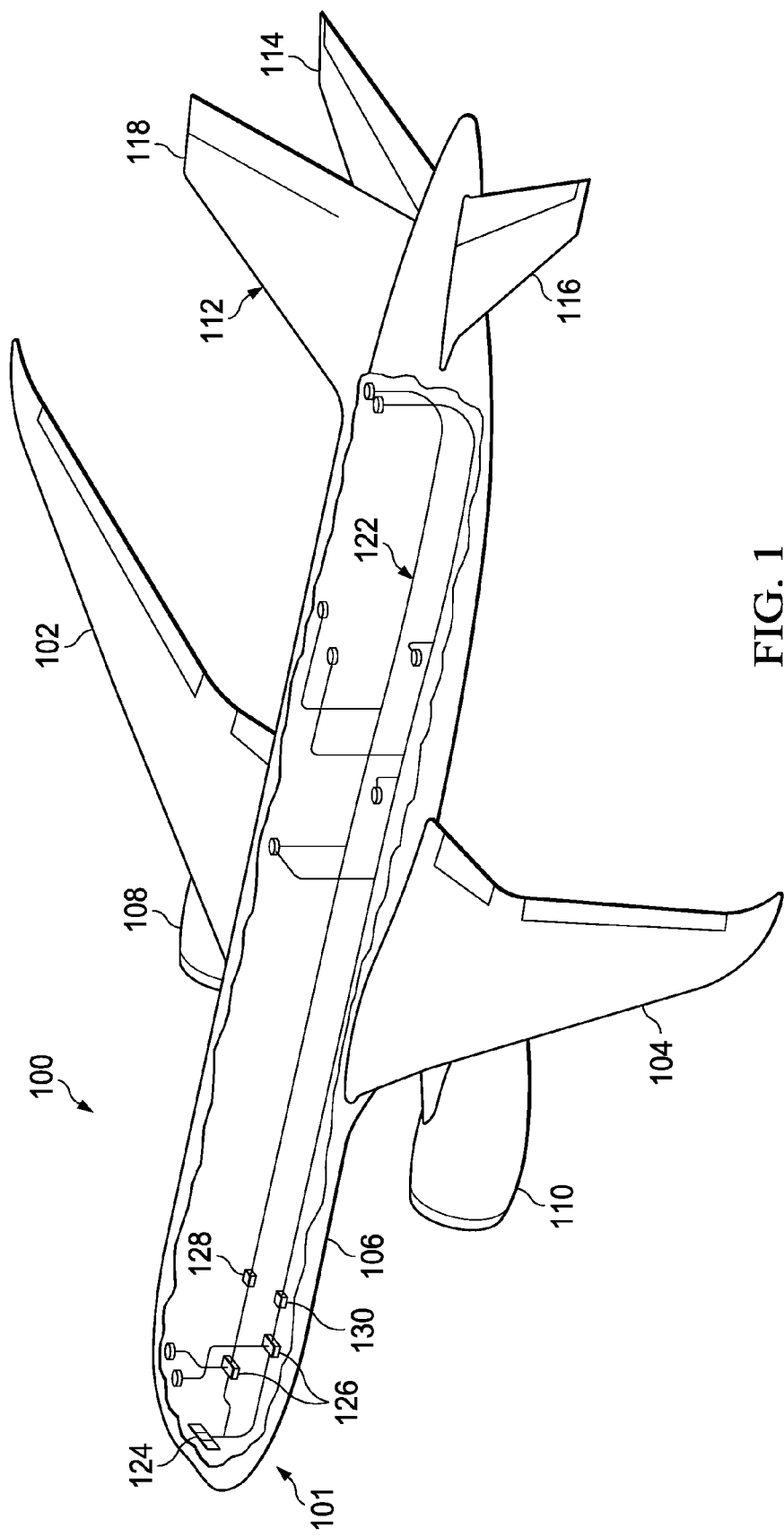
FIG. 1 is an illustration of an aircraft in accordance with an illustrative embodiment.

The illustrative embodiments recognize and take into account one or more considerations. For example, the illustrative embodiments recognize and take into account that one component in a network data processing system that may take more time and effort to test than desired is an optical coupler.

An optical coupler is a hardware device that is configured to receive optical signals from a number of input fibers and send those optical signals to a number of output fibers. A "number" as used herein with reference to items means one or more items. For example, a number of input fibers is one or more input fibers. In these illustrative examples, an optical signal entering an input in an optical coupler may be sent to one or more optical fibers at the output of the optical coupler.

Optical couplers may take various forms. For example, an optical coupler may be formed by fusing optical fibers to each other such that the cores of the optical fibers are in contact with each other to allow transmission of light through the different cores from a single input optical fiber. In other illustrative examples, an optical coupler may be a hollow channel, a solid medium, or some other configuration that receives an optical signal from one optical fiber in the input and sends the optical signal to multiple optical fibers at the output of the optical coupler. An optical coupler that receives an input optical signal and splits the input optical signal into several output optical signals is a star coupler in these illustrative examples.

Optical couplers may have different numbers of inputs and outputs. In some illustrative examples, an optical coupler may have two inputs and two outputs. In other examples, the optical coupler may have four inputs and four outputs, eight inputs and eight outputs, or some number of inputs and outputs.

As the number of inputs and outputs increases, the testing of the optical coupler becomes more tedious and time-consuming. In some illustrative examples, an optical coupler may have forty or more inputs and forty or more outputs. In other words, the optical coupler may provide inputs for forty or more optical fibers and outputs for forty or more optical fibers.

The illustrative examples recognize and take into account that testing an optical coupler involves testing each of the inputs and outputs. This testing may involve selecting an input and testing every output with the selected input. This process may be repeated for each input in the optical coupler.

The illustrative embodiments recognize and take into account that in testing an optical coupler, a human operator may connect an input of the optical coupler to an optical signal source. The human operator then connects one of the outputs to an optical signal detection system. An optical signal is sent through the input and the result is detected by the optical detector at the output.

The human operator then reconnects the optical detector to another output of the optical coupler and performs the same process. This testing is performed for every output for a particular input. After all of the outputs have been tested for the input, another input is selected in the optical coupler and the testing of the outputs is performed again.

As can be seen, when an optical coupler has forty inputs and forty outputs, 1,600 measurements are performed. These measurements are then analyzed to determine whether the optical signals have a desired level of intensity at the different outputs. Performing 1,600 measurements is very time-consuming and tedious for a human operator. Further, these measurements are performed for multiple temperatures. When the testing involves multiple temperatures, the amount of measurements increase. For example, the optical coupler may be tested at temperatures such as −55 degrees Celsius, 25 degrees Celsius, 85 degrees Celsius, and 100 degrees Celsius. With these temperatures, the total number of measurements is 6,400 measurements. This type of testing may take months to complete by a human operator.

Thus, the illustrative embodiments provide a method and apparatus for testing optical couplers. In one illustrative embodiment, an apparatus includes an optical signal source, an optical signal detection system, a switching system, and a controller. The optical signal source is configured to generate an optical signal. The optical signal detection system is configured to detect the optical signal. The switching system is configured to direct the optical signal from the optical signal source to inputs in an optical coupler and direct the optical signal from the outputs of the optical coupler to the optical signal detection system.

Turning now to FIG. 1, an illustration of an aircraft is depicted in accordance with an illustrative embodiment. Aircraft 100 is an illustration of one implementation for an aircraft in which optical network data processing system 101 may be implemented.

Aircraft 100 has wing 102 and wing 104 attached to body 106. Aircraft 100 also includes engine 108 attached to wing 102 and engine 110 attached to wing 104. Tail section 112 of body 106 has horizontal stabilizer 114, horizontal stabilizer 116, and vertical stabilizer 118.

In these illustrative examples, optical network data processing system 101 includes optical network 122. Devices, such as flight deck displays 124, flight control computers 126, and other components, may be connected to optical network 122. In these illustrative examples, optical couplers, such as optical coupler 128 and optical coupler 130, may be used in optical network 122 in aircraft 100.

One or more illustrative embodiments may be implemented to test optical coupler 128 and optical coupler 130 prior to being installed in optical network 122 within optical network data processing system 101. In other illustrative embodiments, one or more illustrative embodiments may be implemented to test optical coupler 128 and optical coupler 130 while these devices are in optical network data processing system 101 in aircraft 100. Thus, the illustrative embodiments may be implemented to test optical coupler 128 and optical coupler 130, prior to installation of these devices in aircraft 100, during installation of these devices in aircraft 100, during maintenance of aircraft 100, or during other parts of the lifecycle of aircraft 100, optical coupler 128, and/or optical coupler 130.

The illustration of aircraft 100 with optical network data processing system 101 is only provided as an example of one manner in which an illustrative embodiment may be implemented. Other illustrative embodiments may be implemented to test optical couplers for other types of aircraft and for optical network data processing systems in other platforms.

Further, in this illustrative example, only two optical couplers are illustrated in optical network 122 for purposes of providing an example of some devices that may be present in optical network 122. Of course, other numbers of optical couplers may be present and other types of devices also may be used. Further, repeaters, optical amplifiers, and other devices may be used in optical network 122.

Figure 2:
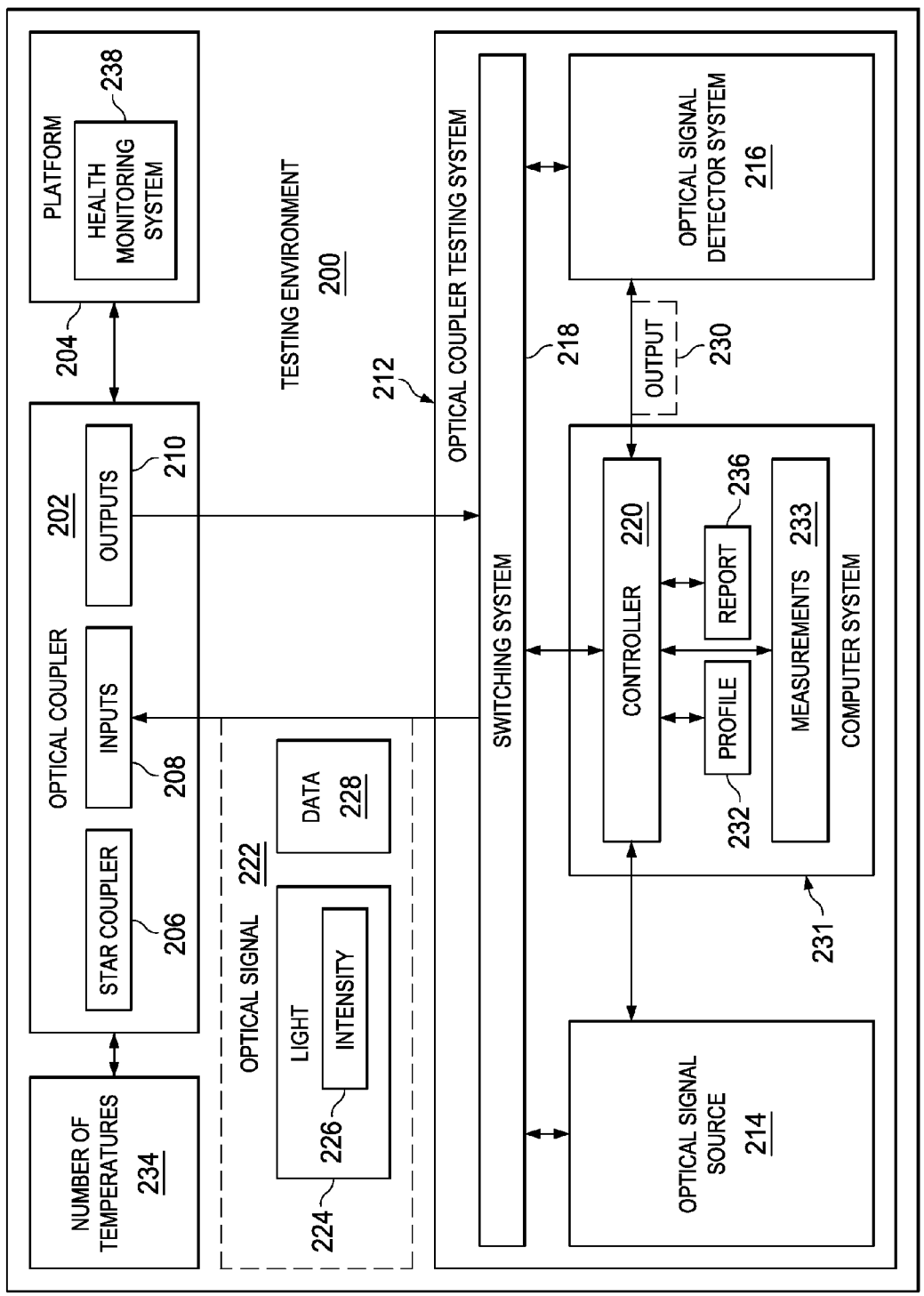
FIG. 2 is an illustration of a block diagram of a testing environment in accordance with an illustrative embodiment.

Turning now to FIG. 2, an illustration of a block diagram of a testing environment is depicted in accordance with an illustrative embodiment. In this illustrative example, testing environment 200 is an example of an environment that may be used to test optical coupler 202 for use in platform 204. Platform 204 may be, for example, aircraft 100 in FIG. 1.

In this illustrative example, optical coupler 202 may take the form of star coupler 206. Optical coupler 202 has inputs 208 and outputs 210. For example, inputs 208 may be ten inputs and outputs 210 may be ten outputs. In another illustrative example, inputs 208 may be forty inputs and outputs 210 may be forty outputs.

With this number of inputs and outputs, optical coupler 202 may be referred to as a 40×40 coupler. Of course, optical coupler 202 may take other forms. For example, optical coupler 202 may be a 30×30 coupler, a 100×100 coupler, or have some other number of inputs 208 and outputs 210. Further, in some alternative examples, other numbers of inputs and outputs may be used for optical coupler 202. For example, without limitation, optical coupler 202 may have 40 inputs and 60 outputs, 30 inputs and 50 outputs, or some other suitable number of inputs and outputs, depending on the particular optical network design used in aircraft 100. In other words, the number of inputs and outputs may be unequal.

In this illustrative example, optical coupler testing system 212 is configured to test optical coupler 202. Optical coupler testing system 212 may be used to determine whether optical coupler 202 performs with a desired level of performance. This desired level of performance may be measured in a number of different ways. For example, the desired level of performance may be measured based on the amount of light that is lost when the light is sent into one of inputs 208 and received at one of outputs 210.

As depicted, optical coupler testing system 212 includes optical signal source 214, optical signal detector system 216, switching system 218, and controller 220. These components may be implemented using hardware and also may include software.

Optical signal source 214 is configured to generate optical signal 222. Optical signal 222 is a light signal. Optical signal 222 is comprised of light 224, which has intensity 226. Further, optical signal 222 also may encode data 228. Optical signal 222 may be generated having various intensities, wavelengths, and other parameters.

Optical signal detector system 216 is configured to detect optical signal 222. Optical signal detector system 216 may generate output 230. Output 230 may be, for example, a current or some other type of output from which measurements 233 may be made.

Switching system 218 is connected to inputs 208 and outputs 210 of optical coupler 202. Switching system 218 is configured to direct optical signal 222 generated by optical signal source 214 to inputs 208 in optical coupler 202. Optical signal 222 travels through optical coupler 202 and appears at outputs 210. Switching system 218 is configured to direct optical signal 222 from outputs 210 in optical coupler 202 to optical signal detector system 216.

As optical signal 222 travels from one or more of inputs 208 through optical coupler 202 to reach outputs 210, losses may occur in intensity 226 of light 224. These losses may be reflected in output 230.

Controller 220 is configured to control testing of optical coupler 202 in these illustrative examples. Controller 220 may be implemented using hardware, software, or a combination of the two. When software is used, the operations performed by the components may be implemented in the program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, controller 220 may be implemented within computer system 231. Computer system 231 is one or more computers. When more than one computer is present in computer system 231, those computers may be in communication with each other using a communications medium such as a network.

In this illustrative example, controller 220 is configured to control the operation of optical signal source 214, optical signal detector system 216, and switching system 218. For example, controller 220 may control the generation of optical signal 222 by optical signal source 214.

Further, controller 220 also may control switching operations performed by switching system 218. In particular, controller 220 may control switching system 218 to direct optical signal 222 from optical signal source 214 into an input in inputs 208 in optical coupler 202. Further, controller 220 also may control switching system 218 to select an output in outputs 210 to receive optical signal 222 after optical signal 222 has traveled through optical coupler 202.

Controller 220 may perform these operations as well as other operations using profile 232. Profile 232 is information that describes testing to be performed on optical coupler 202. For example, profile 232 may include a number of inputs 208 and a number of outputs 210 present for optical coupler 202. Profile 232 also may identify temperatures at which testing should be performed. Other information such as an identification of optical coupler 202, a wavelength of optical signal 222, intensity 226 of light 224 in optical signal 222, data 228 to be encoded in optical signal 222, and other information may be included in profile 232.

Controller 220 receives output 230 and may process output 230 to determine whether optical coupler 202 is performing as desired. For example, controller 220 may generate measurements 233 of losses in intensity 226 of light 224 in optical signal 222. Measurements 233 may be made for combinations of inputs 208 and outputs 210. For example, a measurement may be made for each of outputs 210 with respect to a selected input in inputs 208. These measurements may be made for each of inputs 208 in these illustrative examples.

Further, measurements 233 may be made for number of temperatures 234. Number of temperatures 234 may be selected to identify different temperatures that optical coupler 202 may encounter when used in platform 204.

Controller 220 may generate report 236. Report 236 may indicate whether optical coupler 202 performs as desired. Report 236 also may include measurements 233 and other suitable information depending on the particular implementation. Report 236 may be used to determine whether optical coupler 202 is suitable for use in platform 204.

In some illustrative examples, optical coupler testing system 212 may be used to test optical coupler 202 while optical coupler 202 is located in platform 204. In this particular example, optical coupler testing system 212 may be part of health monitoring system 238. In this example, monitoring of optical coupler 202 may be performed periodically or after certain events to determine whether optical coupler 202 is performing at a desired level.

The different operations performed by optical coupler testing system 212 may occur automatically without input from a human operator. Further, optical coupler testing system 212 may perform testing more quickly than a human operator. Moreover, optical coupler testing system 212 also may select various parameters for testing based on profile 232.

Figure 3:
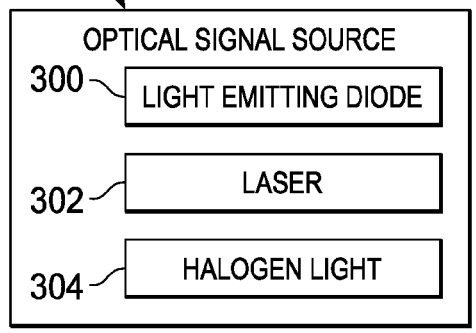
FIG. 3 is an illustration of a block diagram of an optical signal source in accordance with an illustrative embodiment.

Turning now to FIG. 3, an illustration of a block diagram of an optical signal source is depicted in accordance with an illustrative embodiment. This figure illustrates types of light generation devices that may be used in optical signal source 214 to generate optical signal 222 in FIG. 2.

As illustrated, optical signal source 214 may be comprised of one or more light generation devices selected from at least one of light emitting diode 300, laser 302, halogen light 304, and other suitable light sources. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In some illustrative examples, a light generation device may be used for each of inputs 208 in optical coupler 202. For example, a light emitting diode may be present in optical signal source 214 for each of inputs 208. In other illustrative examples, mechanisms such as mirrors and reflectors may be used with a single light generation device to direct optical signal 222 to each of inputs 208.

Figure 4:
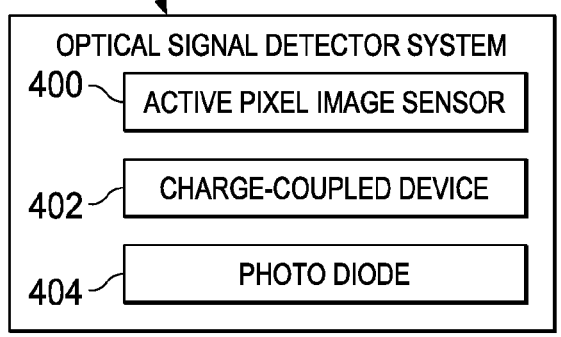
FIG. 4 is an illustration of a block diagram of an optical signal detector system in accordance with an illustrative embodiment.

Turning now to FIG. 4, an illustration of a block diagram of an optical signal detector system is depicted in accordance with an illustrative embodiment. Examples of components that may be used in optical signal detector system 216 are shown in this figure.

As depicted, optical signal detector system 216 may include one or more light detection sensors selected from at least one of active pixel image sensor 400, charge-coupled device 402, photo diode 404, and other suitable types of sensors. In some illustrative examples, a light detection sensor may be present for each of outputs 210 in optical coupler 202 in FIG. 2. In other illustrative examples, a single light detection sensor may be used in conjunction with devices such as mirrors and reflectors to detect optical signal 222 at outputs 210.

Figure 5:
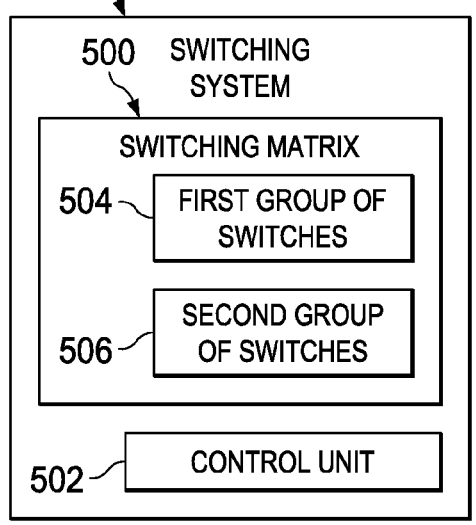
FIG. 5 is an illustration of a block diagram of a switching system in accordance with an illustrative embodiment.

Turning now to FIG. 5, an illustration of a block diagram of a switching system is depicted in accordance with an illustrative embodiment. An example of components that may be used in switching system 218 is depicted in this example.

As illustrated, switching system 218 is comprised of switching matrix 500 and control unit 502. Control unit 502 is comprised of one or more circuits that control the configuration of switching matrix 500. Control unit 502 may receive signals from controller 220 to manage the configuration of switching matrix 500.

Switching matrix 500 includes first group of switches 504 and second group of switches 506. First group of switches 504 is configured to direct optical signal 222 to different inputs in inputs 208 of optical coupler 202. In some cases, one or more optical signals may be sent in a sequence in addition to optical signal 222. Second group of switches 506 is configured to direct optical signal 222 to optical signal detector system 216. For example, second group of switches 506 may be used to select which of outputs 210 are used by optical signal detector system 216 to detect optical signal 222 at outputs 210 of optical coupler 202.

In operation, first group of switches 504 sequentially switches each of inputs 208 of optical coupler 202 to couple optical signal 222 from optical signal source 214, while second group of switches 506 sequentially switches each of outputs 210 of optical coupler 202 to couple optical signal 222 to a detector in optical signal detector system 216. For example, a switch in first group of switches 504 activates an input in inputs 208. Optical signal 222 is sent through the selected input in inputs 208. Optical signal 222 is routed through optical coupler 202 and exits through an output in outputs 210 activated by one of second group of switches 506. Second group of switches 506 sequentially switches outputs in outputs 210 until all of outputs 210 in optical coupler 202 have been tested for the selected input in inputs 208.

This process is repeated for each input in inputs 208 in optical coupler 202. In this manner, the operation of first group of switches 504 and second group of switches 506 allows testing of inputs 208 and outputs 210 sequentially, rather than simultaneously.

The illustration of testing environment 200 in FIG. 2 and components for optical coupler testing system 212 in FIGS. 2-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 220 may be implemented entirely using hardware without computer system 231 in some illustrative examples. Further, optical coupler testing system 212 may be configured to test one or more optical couplers in addition to optical coupler 202. Further, optical coupler testing system 212 may be used for other types of optical couplers other than star coupler 206.

Although the illustrative examples for an illustrative embodiment are described with respect to an aircraft, an illustrative embodiment may be applied to other types of platforms in which an optical network data processing system may be present. For example, platform 204 may be, for example, a mobile platform, a stationary platform, a land-based structure, an aquatic-based structure, and a space-based structure. More specifically, platform 204, may be a surface ship, a tank, a personnel carrier, a train, a spacecraft, a space station, a satellite, a submarine, an automobile, a power plant, a bridge, a dam, a manufacturing facility, a building, and other suitable objects.

Turning now to FIG. 6, an illustration of a data processing system is depicted in accordance with an illustrative embodiment. Data processing system 600 may be used to implement computer system 231 in FIG. 2. In this illustrative example, data processing system 600 includes communications framework 602, which provides communications between processor unit 604, memory 606, persistent storage 608, communications unit 610, input/output (I/O) unit 612, and display 614. In this example, communication framework may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

Figure 7:
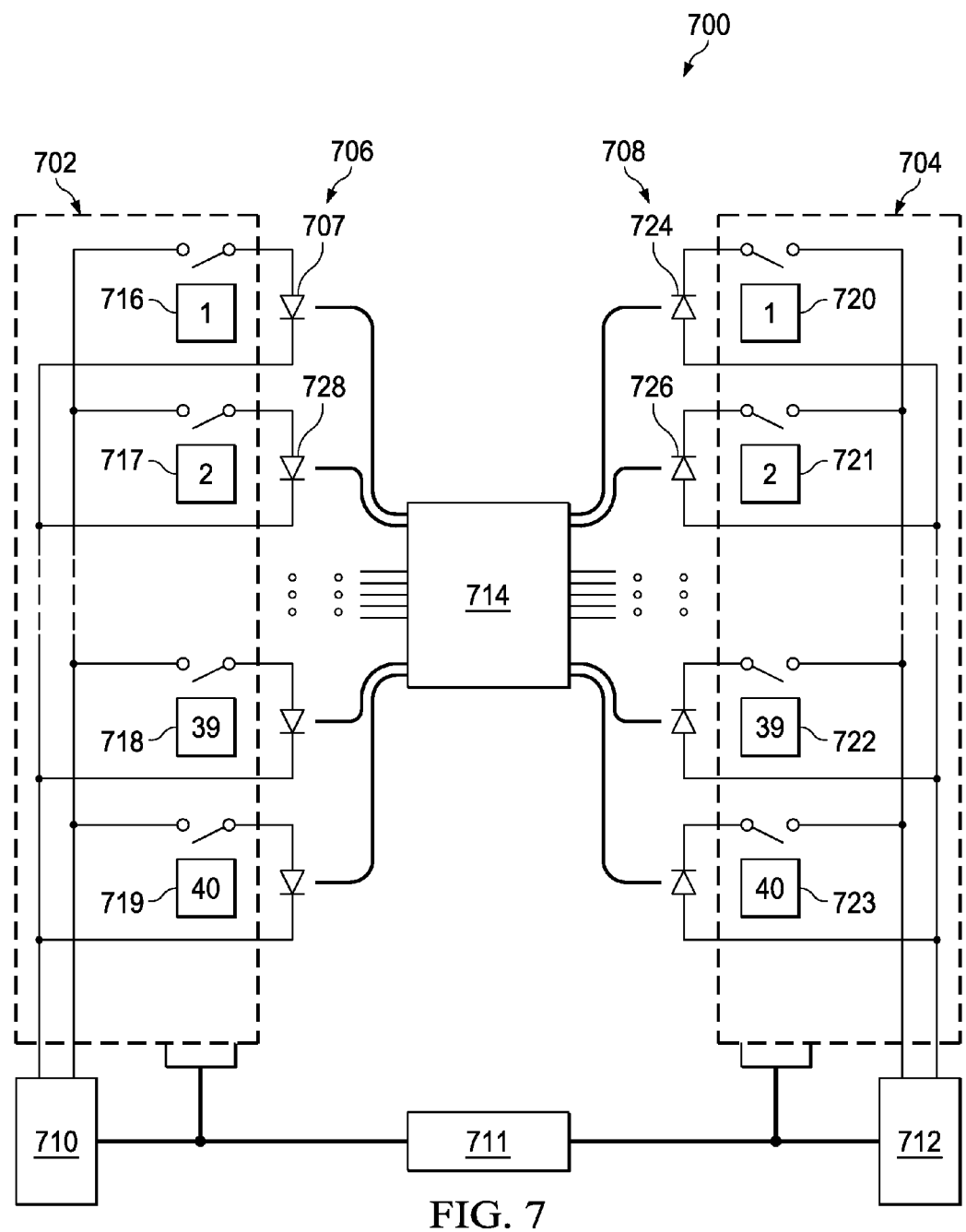
FIG. 7 is an illustration of an optical coupler testing system in accordance with an illustrative embodiment.

With reference to FIG. 7, an illustration of an optical coupler testing system is depicted in accordance with an illustrative embodiment. In this illustrative example, optical coupler testing system 700 is associated with optical signals and optical detectors. In particular, optical coupler testing system 700 is an example of an implementation of optical coupler testing system 212 shown in block form in FIGS. 2-5.

As depicted, optical coupler testing system 700 includes first group of switches 702, second group of switches 704, light emitting diodes 706, and optical detectors 708. Optical coupler testing system 700 also includes current source 710, computer controller 711, and ammeter 712. These components are used to test optical coupler 714.

As depicted, first group of switches 702 comprises forty switches. For purposes of illustration and description, only four switches in first group of switches 702 are shown to illustrate one example without obscuring the illustration of an illustrative embodiment. In this example, switch 716, switch 717, switch 718, and switch 719 are shown in detail. Each of these switches is connected to a light emitting diode in light emitting diodes 706. Of course, optical coupler testing system 700 may have any number of switches in first group of switches 702, depending on the particular implementation.

In this illustrative example, first group of switches 702 is configured to be connected to current source 710. Current in current source 710 is directed through optical coupler testing system 700 by first group of switches 702.

For example, when switch 716 is closed, the light emitting diode 707 in light emitting diodes 706 transmits an optical signal to a corresponding input in the inputs of optical coupler 714. When switch 716 is closed, all other switches in first group of switches 702 are open. Thus, other light emitting diodes in number of light emitting diodes 706 do not transmit optical signals.

Second group of switches 704 is configured to connect detectors in optical detectors 708 to ammeter 712. In these illustrative examples, second group of switches 704 also has forty switches. Of course, any number of switches may be used in second group of switches 704, depending on the particular implementation.

In these illustrative examples, switch 720, 721, switch 722, and 723 are depicted in second group of switches 704. When switch 720 is closed, all of the other switches in second group of switches 704 are open in this illustrative example.

With switch 720 closed, the current generated by optical detector 724 in response to the optical signal from a corresponding output in optical coupler 714 is sent to ammeter 712. In turn, ammeter 712 measures the current generated by detectors in optical detectors 708.

After ammeter 712 measures the current from the detector corresponding to switch 720, switch 721 is closed and all other switches in second group of switches 704 are opened. When switch 721 is activated, current generated by optical detector 726 in response to receiving the optical signal from the corresponding output in optical coupler 714. This process is repeated for all switches in second group of switches 704 for switch 716 in the closed state in first group of switches 702.

After testing of the input corresponding to switch 716 is completed, the input corresponding to switch 718 may be tested. For example, when switch 718 is closed, light emitting diode 728 connected to switch 718 in light emitting diodes 706 sends optical signal to a corresponding input in the inputs of optical coupler 714. This testing is performed with switch 718 closed for all of the switches in second group of switches 704. This process is repeated for all switches in first group of switches 702 and second group of switches 704.

In these illustrative examples, computer controller 711 is configured to control operation of first group of switches 702 and second group of switches 704. Computer controller 711 sequentially switches each switch in first group of switches 702 to direct a current from current source 710 to a light emitting diode in light emitting diodes 706 to the desired input in optical coupler 714. Computer controller 711 also sequentially switches each switch in second group of switches 704 to direct a current generated by an optical detector in optical detectors 708 to send the current to ammeter 712 for measurement. Thus, optical coupler testing system 700 may control testing of optical coupler 714 through computer controller 711.

Figure 8:
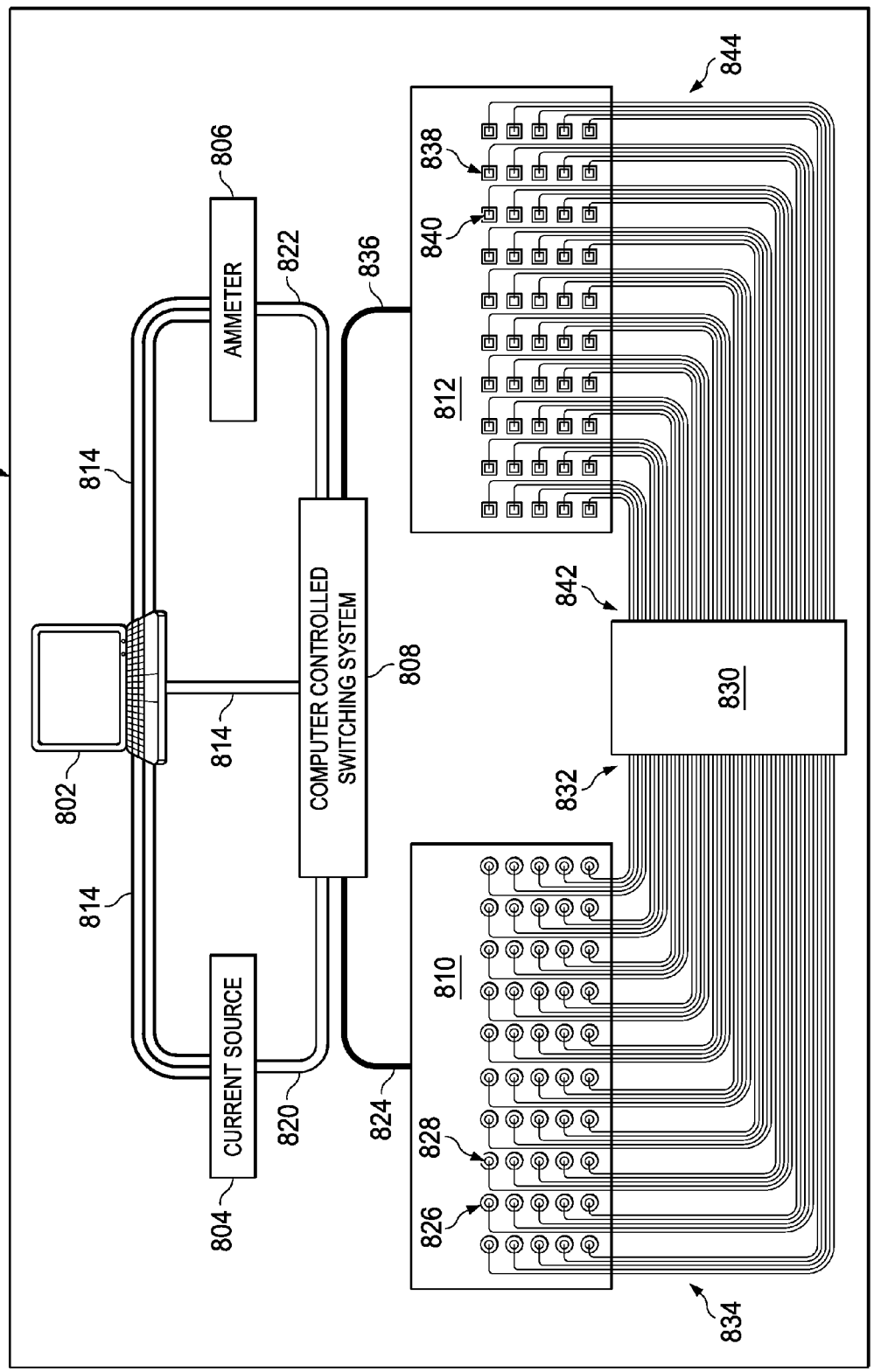
FIG. 8 is an illustration of one implementation of an optical coupler testing system in accordance with an illustrative embodiment.

Turning now to FIG. 8, an illustration of one implementation of an optical coupler testing system is depicted in accordance with an illustrative embodiment. In this illustrative example, optical coupler testing system 800 is an example of one implementation for optical coupler testing system 212 in FIG. 2.

As depicted, optical coupler testing system 800 includes computer controller 802, current source 804, ammeter 806, computer controlled switching system 808, output panel 810, and input panel 812. In this illustrative example, computer controller 802 is an example of an implementation for controller 220 in computer system 231 in FIG. 2.

Computer controller 802 is configured to control the operation of current source 804, ammeter 806, and computer controlled switching system 808. Computer controller 802 is connected to current source 804, ammeter 806, and computer controlled switching system 808 by different portions of bus 814. Bus 814 may take various forms. For example, bus 814 may be daisy-chained data network cables, an optical fiber, a ribbon cable, or some other suitable type of communications link. Bus 814 also may be a general purpose interface bus (GPIB) in these illustrative examples.

Current source 804 is configured to generate a current. Further, current source 804 is configured to generate a current having a level that can be controlled as precisely as desired. In other words, current source 804 may generate a current that is substantially the same during testing operations. The output of current source 804 is connected to computer controlled switching system 808 by cable 820.

Ammeter 806 is configured to identify a level of current received at an input. In this illustrative example, ammeter 806 may be a micro-ammeter. Ammeter 806 is configured to generate data about the current level detected by a detector. When this current is directed through an optical device, this current may be referred to as photocurrent in these illustrative examples. As depicted, the input of ammeter 806 is connected to computer controlled switching system 808 by cable 822.

Computer controlled switching system 808 is configured to direct current generated by current source 804 to output panel 810. Computer controlled switching system 808 is connected to output panel 810 by wire bundle 824. Wire bundle 824 is connected to light emitting diodes 826 associated with output ports 828. Light emitting diodes 826 are configured to generate light for optical signals when light emitting diodes 826 receive current from current source 804 through computer controlled switching system 808.

When one component is "associated" with another component, the association is a physical association in these depicted examples. For example, a first component, light emitting diodes 826, may be considered to be associated with a second component, output ports 828, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, light emitting diodes 826 are selected to be substantially the same. In other words, light emitting diodes 826 may be selected such that all light emitting diodes in light emitting diodes 826 emit an optical signal having substantially the same characteristics when receiving the same input. For example, the intensity of an optical signal emitted from each light emitting diode in light emitting diodes 826 is substantially the same when substantially the same current is sent into each light emitting diode in light emitting diodes 826. This intensity may be referred to as optical power in these illustrative examples.

As depicted, each wire in wire bundle 824 is connected from an output in computer controlled switching system 808 to an output port in output ports 828. In turn, output ports 828 are connected to star coupler 830. In particular, output ports 828 are connected to inputs 832 in star coupler 830. In this illustrative example, the connection of output ports 828 to inputs 832 are made using optical fiber cables 834. In these illustrative examples, light emitting diodes 826 generate light that may be transmitted through optical fiber cables 834 when optical fiber cables 834 are connected to output ports 828.

Computer controlled switching system 808 is connected to input panel 812 by wire bundle 836. Wire bundle 836 is connected to optical detectors 838 associated with input ports 840. Optical detectors 838 are configured to generate current when optical detectors 838 detect light. In these illustrative examples, optical detectors 838 are selected to be substantially identical to each other. In other words, optical detectors 838 are selected such that all optical detectors in optical detectors 838 generate substantially the same current when an optical signal is detected by each of optical detectors 838 having substantially the same intensity.

Further, optical detectors 838 are designed to measure optical signals in a wide range of input intensity. The responsivity of each detector in optical detectors 838 is pre-determined and stored in computer controller 802 as a matrix. The intensity of each of light emitting diodes 826 in output panel 810 is pre-measured and is also stored in computer controller 802 as a matrix. The intensity matrix of light emitting diodes 826 and the detector responsivity matrix are used to calculate the intensity loss matrix of an optical coupler during the optical coupler measurement process. This intensity loss matrix also may be referred to as an insertion loss matrix in these illustrative examples.

Input ports 840 are connected to outputs 842 in star coupler 830. This connection is made using optical fiber cables 844. Thus, light in optical signals that is output at outputs 842 may be transmitted through optical fiber cables 844 to input ports 840 in input panel 812. This light may be detected by optical detectors 838 associated with input ports 840.

In operation, computer controller 802 controls current source 804 to control current. The current may be controlled to have a set amplitude. In some cases, the amplitude may change if data is to be encoded. Computer controller 802 controls computer controlled switching system 808 to select an output port in output ports 828. As a result, the light emitting diode in the selected output port in output panel 810 generates an optical signal.

The optical signal may be light at a set intensity. In some cases, the intensity may change if data is encoded in the optical signal.

This optical signal travels over one of optical fiber cables 834 to reach an input in inputs 832 in star coupler 830. This optical signal travels through star coupler 830 to outputs 842 in star coupler 830. The optical signal travels through optical fiber cables 844 to input ports 840 in input panel 812. Optical detectors 838 generate current based on the intensity of the optical signal detected.

In this illustrative example, computer controller 802 controls computer controlled switching system 808 to select one of the input ports in input ports 840. This selection results in the current generated by the optical detector in optical detectors 838 associated with the input port in input ports 840 being sent to ammeter 806.

In these illustrative examples, ammeter 806 detects the amplitude of the photocurrent generated by the optical detector in optical detectors 838. This photocurrent is proportional to the optical power from a fiber in fiber cables 844.

In these illustrative examples, ammeter 806 generates data identifying the amplitude of the photocurrent detected. This data is sent to computer controller 802 through bus 814. A value of the photocurrent may vary, depending on the type of light sourced used in the different depicted examples. With light emitting diodes 826, the value of the photocurrent may be from about 1 micro-ampere to about 1 mA. In other illustrative examples, the value may be larger if a stronger optical source, such as a laser diode, is used.

Computer controller 802 analyzes the data from ammeter 806 to determine whether the optical signal has a desired level of intensity when sent through star coupler 830. For example, computer controller 802 may identify an intensity level from the amplitude of the current identified by ammeter 806. This intensity level is for a particular output in outputs 842.

Computer controller 802 controls computer controlled switching system 808 such that an optical signal is sent through one of inputs 832. Computer controller 802 controls computer controlled switching system 808 to select one of the input ports in input ports 840. As a result, the current sent to ammeter 806 is current from one of the optical detectors in the input port selected by computer controlled switching system 808.

Computer controller 802 controls computer controlled switching system 808 such that all of input ports 840 are sent to ammeter 806 one at a time or sequentially. In this manner, all of outputs 842 are tested for the selected input in inputs 832.

After all of the outputs are tested for a particular input, computer controller 802 selects another input in inputs 832 using computer controlled switching system 808. This process is performed until the different combinations of inputs and outputs have been tested for star coupler 830. This testing also may be repeated at different temperatures for star coupler 830.

Computer controller 802 analyzes the data collected. The analysis may include determining whether the loss in intensity in the light in the optical signals is greater than desired. Computer controller 802 may generate a report based on the analysis.

The illustration of optical coupler testing system 800 in FIG. 8 is not meant to limit the manner in which different illustrative embodiments may be implemented. This example is only meant to illustrate one manner in which optical coupler testing system 212 in FIG. 2 may be implemented.

For example, an optical signal source may be connected to computer controlled switching system 808. Computer controlled switching system 808 may be connected to inputs 832. In this example, computer controlled switching system 808 switches an optical signal rather than a current. In other illustrative examples, additional input ports and output ports may be present for use in testing one or more optical couplers in addition to star coupler 830.

Figure 9:
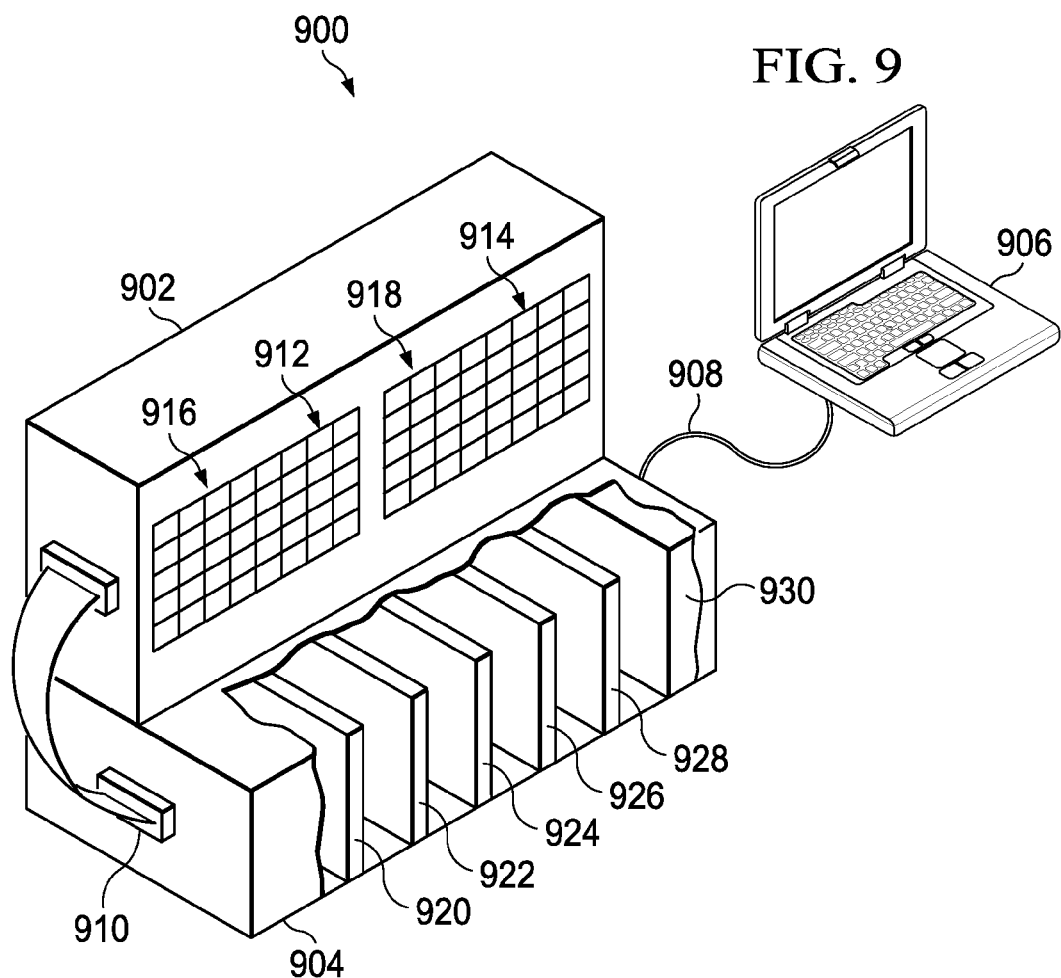
FIG. 9 is an illustration of an optical coupler testing system in accordance with an illustrative embodiment.

In FIG. 9, an illustration of an optical coupler testing system is depicted in accordance with an illustrative embodiment. Optical coupler testing system 900 is an example of a physical implementation of optical coupler testing system 212 shown in FIG. 2.

In this illustrative example, optical coupler testing system 900 includes optical source and detector housing 902, controller housing 904, and computer controller 906. Computer controller 906 may be a laptop, a tablet computer, or some other type of computer.

As depicted, computer controller 906 is connected to controller housing 904 by cable 908. Controller housing 904 is connected to optical source and detector housing 902 by cable 910.

In this illustrative example, optical source and detector housing 902 includes output ports 912 and input ports 914. Output ports 912 are associated with light emitting diodes

916. In these illustrative examples, each output port in output ports 912 has a light emitting diode in light emitting diodes 916.

Optical detectors 918 are associated with input ports 914. In this illustrative example, each input port in input ports 914 has an optical detector in optical detectors 918.

Controller housing 904 includes switch controller card 920, light emitting diode switching matrix card 922, optical detector switching matrix card 924, current source card 926, ammeter card 928, and power supply card 930. These different cards are located within controller housing 904 as can be seen in this exposed view.

Light emitting diode switching matrix card 922 and optical detector switching matrix card 924 are comprised of switches that may be configured to select different inputs and outputs in optical source and detector housing 902. For example, switches in light emitting diode switching matrix card 922 may be configured to select different output ports in output ports 912 to emit optical signals in the associated light emitting diodes in light emitting diodes 916.

Switches in optical detector switching matrix card 924 may be configured to select different input ports in input ports 914 for measuring currents generated by optical detectors 918 associated with input ports 914. These currents may be referred to as photocurrents in these illustrative examples.

Current source card 926 is connected to light emitting diode switching matrix card 922 and provides a current. This current is sent to one of light emitting diodes 916 in output ports 912 based on the configuration of light emitting diode switching matrix card 922.

Ammeter card 928 is configured to generate measurements from currents received from optical detectors 918 associated with input ports 914. The current from a particular optical detector in optical detectors 918 that is sent to ammeter card 928 is selected based on the configuration of optical detector switching matrix card 924.

Power supply card 930 is configured to send power to different components in optical coupler testing system 900. For example, power supply card 930 may be configured to receive power as input and distribute power to other cards in optical coupler testing system 900 in a form useable by the other cards in optical coupler testing system 900.

The illustration of optical coupler testing system 900 in FIG. 9 is not meant to limit the manner in which other optical coupler testing systems may be implemented. For example, other optical coupler testing systems may be implemented such that all of the components are located in a single housing or structure. In still other illustrative examples, optical coupler testing system 900 may be portable or may be implemented in health monitoring system 238 in FIG. 2.

The different components shown in FIGS. 1 and 7-9 may be combined with components in FIGS. 2-6, used with components in FIGS. 2-6, or a combination of the two. Additionally, some of the components in FIGS. 1 and 7-9 may be illustrative examples of how components shown in block form in FIGS. 2-6 can be implemented as physical structures.

Figure 10:
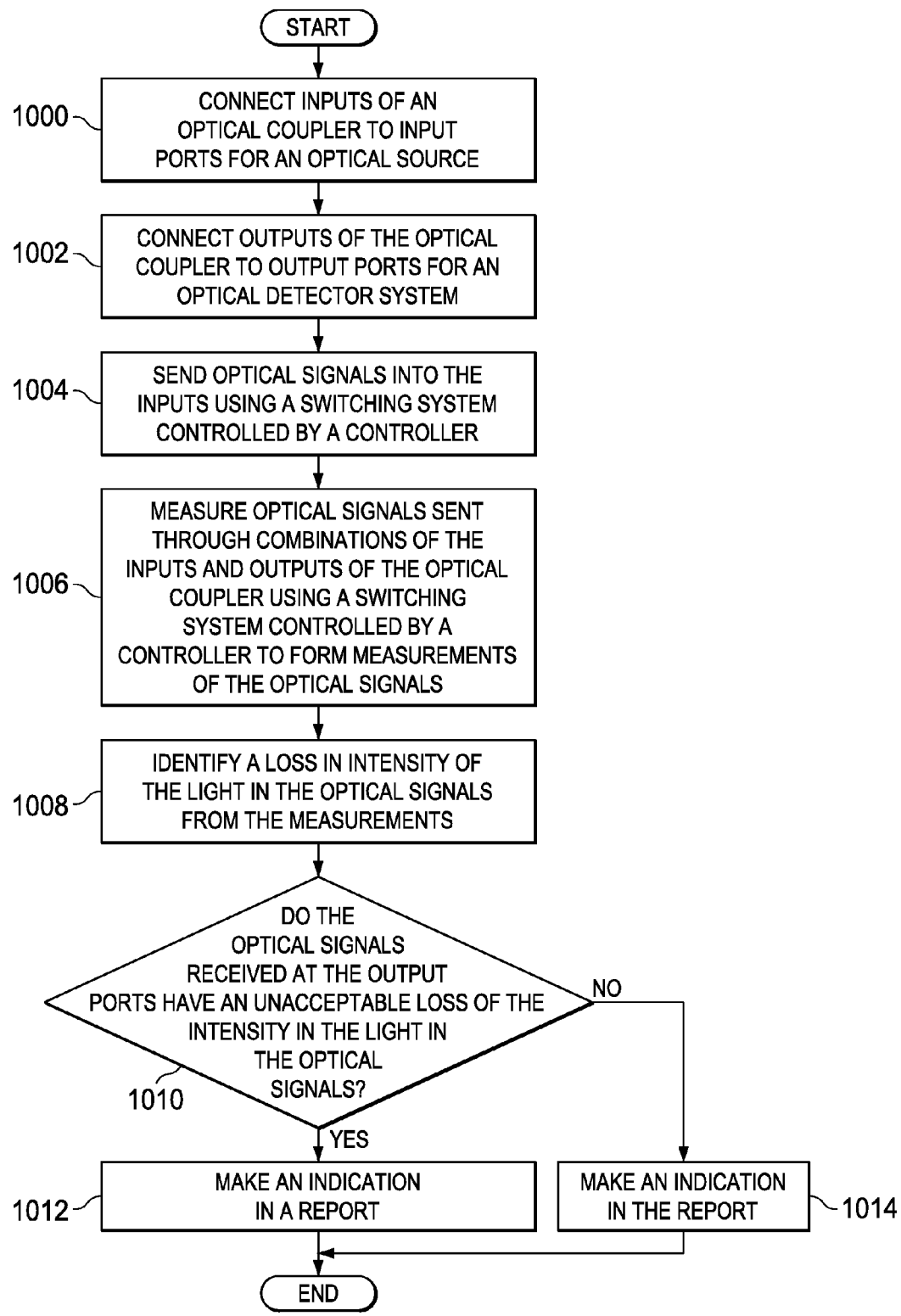
FIG. 10 is an illustration of a flowchart of a process for testing an optical coupler in accordance with an illustrative embodiment.

Turning now to FIG. 10, an illustration of a flowchart of a process for testing an optical coupler is depicted in accordance with an illustrative embodiment. The process illustrated in FIG. 10 may be implemented in optical coupler testing system 212 in FIG. 2.

The process begins by connecting inputs of an optical coupler to input ports for an optical source (operation 1000). The process then connects outputs of the optical coupler to output ports for an optical signal detector system (operation 1002). Next, the process sends optical signals into the inputs using a switching system controlled by a controller (operation 1004).

The process then measures optical signals sent through combinations of the inputs and outputs of the optical coupler using a switching system controlled by a controller to form measurements of the optical signals (operation 1006). A loss in intensity of the light in the optical signals is identified from the measurements (operation 1008). This loss of intensity of the light in the optical signals is a loss of intensity measured at the output of the optical coupler. A determination is made as to whether the optical signals received at the output ports have an unacceptable loss of the intensity in the light in the optical signals (operation 1010).

If the loss in the intensity is unacceptable, an indication is made in a report (operation 1012) with the process terminating thereafter. Otherwise, if the loss in intensity is acceptable, this indication is made in the report (operation 1014) with the process terminating thereafter.

Turning now to FIG. 11, an illustration of a flowchart of a process for testing an optical coupler is depicted in accordance with an illustrative embodiment. The process illustrated in FIG. 11 is a more-detailed example of a process that may be used to test optical coupler 202 in FIG. 2 using optical coupler testing system 212 in FIG. 2.

The process begins by receiving a profile for an optical coupler (operation 1100). This profile may include information such as an identification of the coupler, a coupler size, and other suitable information.

An intensity loss (or insertion loss) matrix is formed (operation 1102). In some illustrative examples, the intensity loss matrix is a data structure formed in a memory in controller 220 in optical coupler testing system 212. This intensity loss matrix is used to store information about the test performed. The size of the intensity loss matrix is based on the size of the optical coupler. For example, if the optical coupler has forty inputs and forty outputs, the intensity loss matrix may be a 40×40 array.

The process then sends current into an input of a switching system (operation 1104). The process then sets a variable "i" equal to 1 (operation 1106). The variable "i" is an index used to identify a light emitting diode that is to be activated for a particular input in the optical coupler.

The process turns on the light emitting diode corresponding to the current value of variable "i" by turning on light emitting diode switch "i" in a light emitting diode switching matrix (operation 1108). The process sets a variable "j" equal to 1 (operation 1110). The variable "j" is an index identifying the optical detector for an output in the optical coupler that is to be measured.

The process then selects an optical detector identified in the variable "j" (operation 1112). In operation 1112, the selection may be made by turning on switch "j" in a detector switching matrix. Current generated by the optical detector is identified by an ammeter (operation 1114). The current is used to identify a loss in intensity from the optical signal sent from the light emitting diode identified by the variable "i" and detected at the output connected to the optical detector identified by the variable "j" (operation 1116). In other words, operation 1116 identifies and calculates the loss of intensity of the light from the input of the optical coupler to the output of the optical coupler from the current generated in the optical detector selected for testing. The process then stores the result in the intensity loss matrix (operation 1118).

A determination is made as to whether the variable "j" is equal to the number of outputs in the optical coupler (operation 1120). If the variable "j" is not equal to the number of outputs in the optical coupler, the variable "j" is incremented by 1 (operation 1122) with the process then returning to operation 1112. In operation 1122, the process selects another output in the optical coupler for the same input. This loop allows the process to select all of the outputs for one input when testing the optical coupler.

With reference again to operation 1120, if "j" is equal to the number of the optical coupler outputs, a determination is made as to whether the variable "i" is equal to the number of inputs in the optical coupler (operation 1124). If the variable "i" is not equal to the number of inputs in the optical coupler, the variable "i" is incremented by 1 (operation 1126) with the process then returning to operation 1108.

With reference again to operation 1124, if the variable "i" is equal to the number of inputs, the process analyzes the data and generates a report (operation 1128) with the process terminating thereafter. The report generated in operation 1128 may include at least one of an identification of whether any intensity loss for any of the combinations of inputs and outputs is greater than desired, a graph showing the intensity losses for the different combinations of inputs and outputs, and any other suitable information.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for testing optical couplers. In these illustrative examples, the testing may be performed prior to installing an optical coupler in a platform. In other illustrative examples, the testing may be performed during the optical coupler installation in the platform or while the optical coupler is used in the platform as part of a health monitoring system.

With the optical coupler testing system, testing of optical couplers may be performed more quickly and more accurately. For example, testing of an optical coupler may be performed more quickly with the computer controlled process as opposed to with a human operator. Further, the optical coupler testing system in the illustrative examples may reduce errors with the number of tests performed. Further, testing of optical couplers becomes practical using the different illustrative embodiments. The testing performed using the optical coupler testing system also may reduce the cost of optical couplers. For example, the tests may reduce the cost of an optical coupler with forty inputs and forty outputs by about $5,000.00.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an optical signal source configured to generate an optical signal;
an optical signal detector system configured to detect the optical signal;
a switching system configured to direct the optical signal from the optical signal source to inputs in an optical coupler and direct the optical signal from outputs in the optical coupler to the optical signal detector system; and
a controller configured to automatically control the switching system to select the inputs in the optical coupler for transmission of the optical signal into the optical coupler, select the outputs in the optical coupler for measuring the optical signal output from the optical coupler, and measure the optical signal from the outputs selected to form measurements, wherein the switching system is configured to direct current to a light emitting diode associated with a selected output in the outputs connected to an input in the inputs in the optical coupler, the light emitting diode transmits the optical signal to the input in the inputs in the optical coupler, and the optical signal detector system receives the optical signal from the outputs in the optical coupler.

2. The apparatus of claim 1, wherein the measurements comprise intensities for the optical signal.

3. The apparatus of claim 1, wherein the controller is further configured to identity losses in an intensity of light in the optical signal from the measurements.

4. The apparatus of claim 1, wherein the controller is configured to receive a profile for the optical coupler and to automatically control the switching system, using the profile, to select the inputs in the optical coupler for transmission of the optical signal into the optical coupler and select the outputs in the optical coupler for measuring the optical signal output from the optical coupler.

5. The apparatus of claim 1 further comprising:
input ports connected to the optical signal source, wherein the input ports are configured to be connected to the inputs in the optical coupler; and
output ports connected to the optical signal detector system, wherein the output ports are configured to be connected to the outputs in the optical coupler.

6. The apparatus of claim 5, wherein the optical signal source comprises:
a plurality of light emitting diodes associated with the input ports.

7. The apparatus of claim 5, wherein the optical signal detector system comprises:
a plurality of optical detectors associated with the output ports, wherein the plurality of optical detectors is configured to measure the optical signal.

8. The apparatus of claim 7, wherein the plurality of optical detectors is configured to generate current from the optical signal and wherein a level of current is generated based on an intensity of the optical signal.

9. The apparatus of claim 5, wherein the switching system is configured to select an output port in the output ports of the optical coupler, wherein an optical intensity loss at the output port is measured.

10. The apparatus of claim 1, wherein the optical coupler is a star coupler.

11. The apparatus of claim 10, wherein the star coupler has 40 inputs and 40 outputs.

12. A method for testing an optical coupler, the method comprising:
   connecting inputs of the optical coupler to output ports of an optical signal source;
   connecting outputs of the optical coupler to input ports for an optical signal detector system;
   sending optical signals to each of the inputs, including sending current into a switching system, and sequentially switching the switching system to input current to light emitting diodes to send the optical signals from the light emitting diodes to the inputs of the optical coupler; and
   measuring the optical signals sent through combinations of the inputs and the outputs of the optical coupler using the switching system controlled by a controller to form measurements of the optical signals, including measuring the optical signals at all of the outputs for the each of the inputs using the switching system, sequentially selecting optical detectors connected to the outputs of the optical coupler for each of the light emitting diodes generating the optical signals using the switching system, and measuring a current generated by each of the optical detectors.

13. The method of claim 12 further comprising:
   identifying a loss in an intensity of light in the optical signals from the measurements.

14. The method of claim 13 further comprising:
   determining whether an unacceptable loss of the intensity in the light in the optical signals is present.

15. The method of claim 14 further comprising:
   generating a report on the unacceptable loss in the intensity of the light in the optical signals.

16. The method of claim 12, wherein the measuring step is performed at a number of temperatures.

17. The method of claim 12, wherein the measuring step is performed using a profile for the optical coupler.

* * * * *